Nov 1, 1949.    H. E. BEAVER    2,486,629
MEAT TRIMMING GAUGE
Filed Oct. 12, 1945.
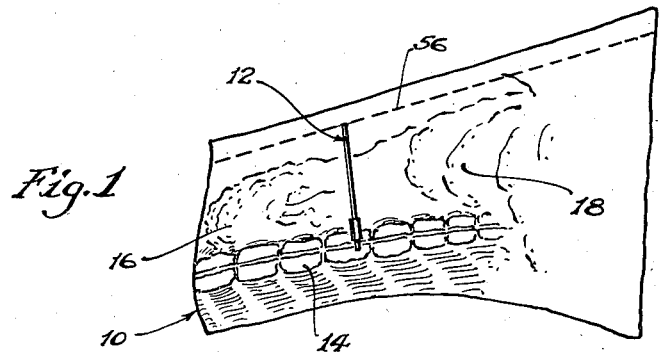
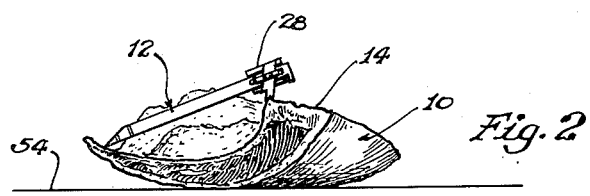
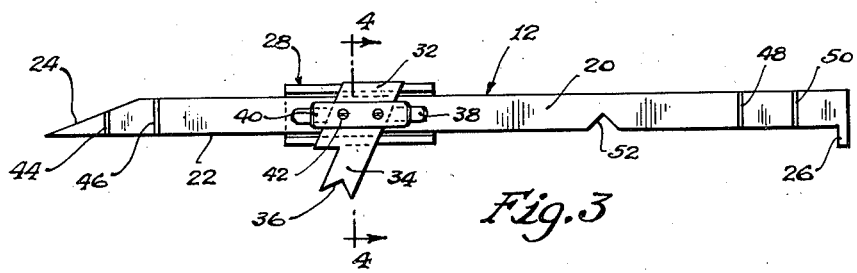
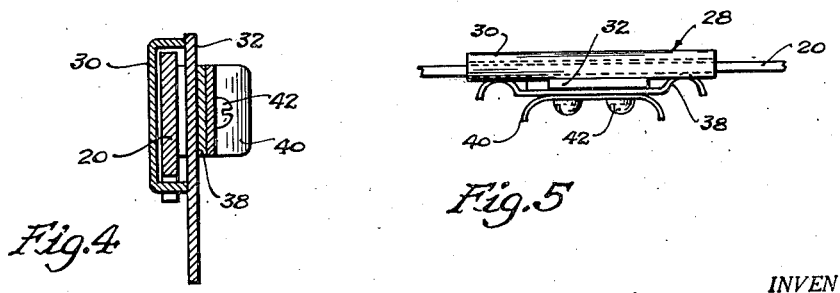
INVENTOR.
Henry E. Beaver
BY
R. G. Story
ATTORNEY Patented Nov. 1, 1949

2,486,629

UNITED STATES PATENT OFFICE 2,486,629

MEAT TRIMMING GAUGE

Henry E. Beaver, Chicago, Ill., assignor to Swift & Company, Chicago, Ill., a corporation of Illinois Application October 12, 1945, Serial No. 621,893

1 Claim. (Cl. 33—174)

This invention relates to improvements in gauges and has particular reference to a gauge for use in trimming meat cuts although the invention is not to be considered as limited to any particular use but as for an improved gauge arrangement for any purpose for which it may be found useful.

Specific instructions have been authorized for the preparation of standard commercial cuts of meat, the most important being set forth in the Maximum Price Regulations of the War Food Administration. For example, section 169 of the Maximum Price Regulations contains the following specification for a trimmed full loin of beef:

"Fourth, the excess loin (lumbar) and pelvic (sacral) fat shall be trimmed from the inside of the full loin by placing the full loin upon a flat surface with no other support to change its position, meat side down, and removing all fat which extends above a flat plane parallel with the flat surface supporting the full loin and on a level with the full length of the protruding edge of the lumbar section of the chine bone. Then all fat shall be removed which extends above a flat plane using the following two lines as guides for each edge of the plane; an imaginary line parallel with the full length of the protruding edge of the lumbar section of the chine bone which line extends 1" directly above such protruding edge; a line on the inside of the loin two inches from the flank edge and running parallel with such edge for the full length of the loin. All fat obstructing the measurement of the second line shall first be removed. In addition to the foregoing all rough fat in the pelvic cavity of the heavy end of the loin (sirloin) shall be trimmed smooth and trimming by a knife shall be apparent. No fat remaining in the pelvic cavity shall exceed one inch in depth."

These specifications are definite and exact and it is apparent that an attempt to comply with them relying entirely on visual estimation would result in undesirable variation between different cuts of the same specification.

It is therefore an object of the present invention to provide a device for accurately gauging the trimming cuts on standard meat cuts so that the meat cuts can be made substantially uniform and in strict compliance with official specifications.

A further object resides in the provision of a gauge device of the character indicated which will accurately designate the trimming plane for a standard cut of meat.

A still further object resides in the provision of a gauge device of the character indicated so arranged that various trimming lines and at least one trimming plane may be established by the use of a single gauge device.

An additional object resides in the provisions of a gauge device of the character indicated that is simple and inexpensive to manufacture and is simple in operation requiring no highly developed skill on the part of the operator.

Other objects and advantages will become apparent from the following description when considered in connection with the accompanying drawing and from the appended claim.

In the drawing:

Figure 1 is a plan view of a standard loin cut of beef showing the application thereto of a gauge constructed according to the invention for establishing a trimming plane across the inner face of the cut;

Figure 2 is an end elevational view of the meat cut shown in Figure 1 showing the cut resting upon a flat, substantially level support with a gauge in operative position thereon;

Figure 3 is a side elevational view of a gauge constructed according to the invention;

Figure 4 is a sectional view on a somewhat enlarged scale on the line 4—4 of Figure 3; and Figure 5 is a top plan view of a fragmentary portion of the gauge shown in Figure 3, particularly showing the slidable support thereon.

With continued reference to the drawings, in which like reference numerals are used to designate similar parts throughout, the numeral 10 generally indicates the meat cut of Figures 1 and 2 and the numeral 12 generally indicates the gauge for establishing the trimming plane.

The beef loin cut 10 has along one edge thereof a series of articulated vertebrae 14, the inner portion of which will hereinafter be referred to as the chine bone.

The meat cut 10, before trimming, has a large amount of lumbar and pelvic or sacral fat, which is indicated at 16 and 18 respectively, and the Maximum Price Regulations as quoted above require that this fat be reduced to a specified amount as set forth in the above quoted portion of section 169 of the Maximum Price Regulations. While the trimming plane for the excess fat is definitely set forth in the quoted specification, it is practically impossible to satisfactorily determine this plane by a visual estimate on an article having a shape as irregular as a standard cut of beef. The gauge 12 has therefore been devised to make possible the actual location of this trimming plane.

Referring particularly to Figure 3, the gauge comprises an elongated flat bar portion 20 having a straight edge along at least the lower edge 22 thereof. At one end the width of the bar is tapered down to the straight edge, as indicated at 24, for convenience in applying the bar to meat cut in the manner to be more specifically described. At the opposite end the bar is provided with a depending abutment 26 which prevents accidental removal of the slidable support portion, generally indicated at 28. This support, as particularly shown in Figures 4 and 5, comprises a channel-shaped member 30 having a depth sufficient to slidably receive the bar 20 and having an arm member 32 welded across the open face thereof. This arm member, as particularly shown in Figure 3, has a relatively wide portion welded to the member 30 and has a narrower portion 34 extending downwardly when the gauge is in operative position and provided at its lower end with a terminal notch 36. The slidable support 28 is frictionally held in adjustable position along the length of the bar by suitable means such as the flat spring 38 which has inwardly bent end portions bearing against the side of the bar 20 and is movable to different positions along the bar by a manually engageable member 40 in the form of a flat metal strip having its ends bent outwardly, as is clearly shown in Figure 5. Both the member 40 and the spring 38 are secured to the support by suitable means such as the screws 42 threaded into the wider portion of the arm 32.

At its tapered end, the bar 20 is provided with spaced indicia 44 and 46 in the form of shallow grooves cut or etched into the material of the bar and at the abutment end is provided with similar indicia 48 and 50. Intermediate its length, the bar is provided at its lower edge portion with a notch 52 which is disposed at a specified distance from the pointed end of the bar.

In using the gauge, the meat cut is placed on a flat support 54 and the fat along the inner edge of the chine bone is trimmed away along a plane substantially parallel to the supporting surface. A line, as indicated at 56, in Figure 1, is then located along the flank edge of the cut, the location of this line being conveniently determined by placing the indicia 46 of the gauge at the flank edge of the cut with the pointed end of the gauge projecting inwardly and marking the location of the inner end of the gauge. These markings are then joined together to form a continuous line and the excess fat along this line is removed. The gauge is then located near one end of the cut with the pointed end on the line 56 and the support 28 is adjusted until the lower end rests upon the inner edge of the chine bone 14 and the fat is then cut away to the level of the lower edge of the gauge. This operation is repeated at spaced intervals along the length of the cut until a sufficient number of grooves or cuts have been provided to constitute a satisfactory guide for removing the excess fat above the plane indicated in the Maximum Price Regulations section quoted above.

The notch 52 is used in determining the position of one end of the line along which the loin cut is severed from the flank. This is done by placing the notch 52 on the inner edge of the chine bone at the proper end of the cut and marking the location of the pointed end of the gauge.

The other indicia 44, 48 and 50 may be used in determining the location of the line 56 and are also useful in determining other required dimensions in preparing standard meat cuts.

When the improved gauge is used, the trimming plane as specified in the Regulations is definitely determined and the operator can be sure that the Regulations have been specifically complied with in preparing the standard meat cut. The gauge is not only highly useful in determining this fat trimming plane but also combines all of the necessary measuring dimensions for preparing the standard loin cut in one instrument which is inexpensive to manufacture, light in weight and extremely simple to use.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and language of equivalency of the claim are therefore intended to be embraced therein.

I claim:

A meat trimming gauge for indicating the proper dressing out of a rib cut with respect to the flank edge and chine bone thereof, comprising a bar having a straight edge, a scribing point at the end of said bar, said point forming a termination for one end of said edge, said point being in line with said edge, a sliding support on said bar movable parallel to said edge, and said support having an arm element affixed thereto and positioned to project from said straight edge at a given acute angle so that, as the gauge is used, the arm will be substantially vertical, said arm being notched at its projecting end to cooperate with the chine bone with the length between the notch and said edge being a given fixed distance whereby the scribing point may be made to follow a line previously scribed along the flank edge of the cut while the notched end of the arm rides on the exposed upper edge of the chine bone of the cut to position the straight edge for indicating the proper trimming to be made to produce the desired dressed-out rib cut.

HENRY E. BEAVER.

REFERENCES CITED

The following references are of record in the file of this patent:

UNITED STATES PATENTS

| Number | Name | Date |
| --- | --- | --- |
| 367,290 | Gilmer | July 26, 1887 |
| 563,089 | Strange | June 30, 1896 |
| 579,952 | Campbell | Apr. 6, 1897 |
| 1,020,020 | Brawley | Mar. 12, 1912 |
| 1,021,692 | McAnelly | Mar. 26, 1912 |
| 1,500,623 | Hurd | July 8, 1924 |
| 1,520,450 | Smith | Dec. 13, 1924 |
| 1,702,231 | Zamostny | Feb. 12, 1929 |
| 1,826,807 | McDanel | Oct. 13, 1931 |
| 1,959,022 | Donahoe | May 15, 1934 |
| 2,158,313 | Von Hafe | May 16, 1939 |
| 2,245,350 | Marshall | June 10, 1941 |

FOREIGN PATENTS

| Number | Country | Date |
| --- | --- | --- |
| 346,292 | France | Nov. 21, 1904 |